(12) United States Patent
Silet et al.

(10) Patent No.: US 11,428,111 B2
(45) Date of Patent: Aug. 30, 2022

(54) DEVICE FOR COOLING A TURBOMACHINE HOUSING

(71) Applicant: SAFRAN AIRCRAFT ENGINES, Paris (FR)

(72) Inventors: Benoit Guillaume Silet, Moissy-Cramayel (FR); Laurent Claude Descamps, Moissy-Cramayel (FR); Bertrand Guillaume Robin Pellaton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/059,738

(22) PCT Filed: May 28, 2019

(86) PCT No.: PCT/FR2019/051258
§ 371 (c)(1),
(2) Date: Nov. 30, 2020

(87) PCT Pub. No.: WO2019/229377
PCT Pub. Date: Dec. 5, 2019

(65) Prior Publication Data
US 2021/0222581 A1 Jul. 22, 2021

(30) Foreign Application Priority Data
May 30, 2018 (FR) ...................................... 1854643

(51) Int. Cl.
*F01D 11/24* (2006.01)
*F01D 25/12* (2006.01)
(Continued)

(52) U.S. Cl.
CPC .............. *F01D 11/24* (2013.01); *F01D 25/12* (2013.01); *F01D 25/14* (2013.01); *F02C 7/18* (2013.01); *F05D 2260/20* (2013.01)

(58) Field of Classification Search
CPC .................................. F01D 25/12; F01D 25/14
See application file for complete search history.

(56) References Cited

U.S. PATENT DOCUMENTS 8,869,539 B2 * 10/2014 Daguenet .................. F02C 7/20
60/796
10,077,677 B2 * 9/2018 Prestel ..................... F01D 11/24
(Continued)

FOREIGN PATENT DOCUMENTS

FR     3 021 700 A1    12/2015
FR     3 041 037 A1     3/2017
FR     3 050 228 A1    10/2017

OTHER PUBLICATIONS

International Patent Application No. PCT/FR2019/051258, International Search Report and Written Opinion dated Oct. 4, 2019, 12 pgs.
(Continued)

*Primary Examiner* — Ninh H. Nguyen
*Assistant Examiner* — John S Hunter, Jr.
(74) *Attorney, Agent, or Firm* — Lathrop GPM LLP

(57) ABSTRACT

A cooling device for an annular casing of a turbomachine includes a collector housing having ejection openings in a radially inner part of the collector housing facing the annular casing and at least two cooling tubes extending circumferentially from the collector housing and having election openings in a radially inner part of the tubes facing the annular casing. The collector housing having an air passage formed by a radial groove extending radially from a radially inner end of the collector housing to a radially outer end of (Continued)

the collector housing and an axial groove extending from a first axial end to a second axial end of the collector housing.

10 Claims, 4 Drawing Sheets

(51) Int. Cl.
  *F01D 25/14* (2006.01)
  *F02C 7/18* (2006.01)

(56) References Cited

U.S. PATENT DOCUMENTS

| | | | |
|---|---|---|---|
| 10,677,093 B2 * | 6/2020 | Pellaton | F01D 25/14 |
| 10,844,789 B2 * | 11/2020 | Bunel | F01D 25/14 |
| 2021/0222581 A1 * | 7/2021 | Silet | F01D 11/24 |

OTHER PUBLICATIONS

French Patent Application No. FR1854643; Search Report dated Feb. 20, 2019; 10 pgs.

* cited by examiner

DEVICE FOR COOLING A TURBOMACHINE HOUSING

CROSS-REFERENCE TO RELATED APPLICATIONS

This application is a 35 U.S.C. § 371 filing of International Application No. PCT/FR2019/051258 filed May 28, 2019, which claims the benefit of priority to French Patent Application No. 1854643 filed May 30, 2018, each of which is incorporated herein by reference in its entirety.

FIELD OF THE INVENTION

The present invention relates to device for cooling a turbomachine casing, such as for instance a double-flow turbomachine.

BACKGROUND OF THE INVENTION

FIG. 1 shows a turbomachine 1 with double flow and double spool. The axis of the turbomachine is referenced X and corresponds to the axis of rotation of the rotating parts. In the following, the terms axial and radial are defined in relation to the X axis.

Turbomachine 1 has, from upstream to downstream in the direction of gas flow, a blower 2, a low-pressure compressor 3, a high-pressure compressor 4, a combustion chamber 5, a high-pressure turbine 6 and a low-pressure turbine 7.

The air from fan 2 is divided into a primary flow 8 flowing into a primary annular vein 9, and a secondary flow 10 flowing into a secondary annular vein 11 surrounding the primary annular vein 10.

The low-pressure compressor 3, the high-pressure compressor 4, the combustion chamber 5, the high-pressure turbine 6 and the low-pressure turbine 7 are located in the primary section 9.

The rotor of the high pressure turbine 6 and the rotor of the high pressure compressor 4 are coupled in rotation via a first shaft 12 in order to form a high pressure body.

The rotor of the low-pressure turbine 7 and the rotor of the low-pressure compressor 3 are coupled in rotation via a second shaft 13 in order to form a low-pressure body, the blower 2 being able to be connected directly to the rotor of the low-pressure compressor 3 or via an epicyclic gear train for example.

As is best seen in FIG. 2, the low-pressure turbine 7 has in particular different successive stages with moving impellers 14 and fixed parts. The impeller has a disc 15 on which blades 16 are mounted. The ends of the blades 16 are surrounded by a fixed ring 17 made of abradable material, said ring 17 being fixed on the turbine casing 18. Vanes 19 are located downstream of the impellers 14. Vanes 19 and rings 17 are mounted on the casing by means of flanges or hooks 20 extending from the radially inner surface of the casing 18.

In order to guarantee a high efficiency of the turbo machine, the air flow not passing through the impellers 14 of the individual stages must be limited, i.e. leaks between the radially outer ends of the blades 16 and the ring 17 made of abradable material must be limited. To do this, the clearance must be checked at this interface, as this clearance is dependent on the temperature of casing 18, and in particular on the areas of said casing 18 containing the hooks or flanges 20 supporting ring 17.

The primary air flow from combustion chamber 5 is hot and heats the downstream parts, such as the fixed and mobile parts of the turbine 6, 7.

In order to control the above-mentioned clearance and to avoid any premature degradation of the various stationary and mobile parts of the turbine, it is necessary to provide effective cooling means that can be easily integrated into the environment of the turbomachine.

The patent application FR 3 021 700, on behalf of the Applicant, discloses a cooling device 21 of a low-pressure turbine 7 casing 18, visible in FIG. 3, with collector housings 22, each collector housing 22 forming an axially extending channel.

The device 21 also includes tubes 23 extending circumferentially on either side of the collector housing 22. These tubes 23, also called ramps, are formed by curved pipes of circular cross-section, each tube 23 extending circumferentially around the casing, for example at an angle of about 90°. Tubes may be held in place by stationary arms 36.

Each tube 23 has an air inlet opening into the channel of the corresponding collector housing 22 and a closed distal end. Each tube 23 also has a cylindrical wall with air ejection openings facing casing 18, so that cooling air can enter the collector housing 22 and then the tubes 23 before opening through the openings facing casing 18 to cool it. This is known as impact cooling because the air impacts the casing 18.

The radially inner part of the housing also has air ejection openings facing the housing for cooling.

It has been found that the areas of the housing opposite the casings have been damaged by severe thermal stress due to insufficient cooling of these areas.

SUMMARY OF THE INVENTION

The invention more particularly aims at providing a simple, efficient and cost-effective solution to these problems.

For this purpose, it provides a device for cooling an annular casing of a turbomachine, comprising a collector housing extending along an axis of the casing and having a radially inner end and radially outer end, the collector housing comprising ejection openings in a radially inner part of the collector housing facing the annular casing, at least two cooling tubes extending circumferentially and connected to an internal volume of the housing at the radially inner end, the at least two cooling tubes comprising ejection openings in a radially inner part of the at least two cooling tubes facing the annular casing, the collector housing also including an air passage formed by a radial groove extending radially from the radially inner end of the collector housing to the radially outer end of the housing, and an axial groove extending from a first axial end to a second axial end of the housing.

The recessed area can extend radially from the inside to the outside. The recessed area may extend from a radially inner end of the housing to a radially outer end of the housing. In other words, the recessed area can also open radially outside the housing.

Alternatively, the recessed area may extend over only part of the radial dimension of the housing and open into a radially central area of the housing.

The recessed area can be formed by at least one hole in the housing. In other words, the recessed area may have a closed section.

Alternatively, the recessed area can be formed by at least one groove or, more generally, have an open section and open out circumferentially.

In all cases, the recessed area allows part of the cooling air that has impacted the casing to be extracted and discharged to another area. This avoids trapping part of the cooling air between the housing and the casing, which would cause the relevant area of the casing to become very hot and thus cause premature damage to the area.

On the contrary, in the invention, the recessed area allows for better air circulation, thus avoiding heating and damage to the casing.

Each recessed area may have a rectilinear portion extending radially from a radially inner end to a radially outer end of the housing.

The radially rectilinear part of the recessed area can be formed by a groove or a hole.

Each recessed area may have a rectilinear portion extending circumferentially from a first axial end to a second axial end of the housing.

The circumferentially extending rectilinear part of the recessed area can be formed by a groove or a hole.

Each recessed area is connected to a tube connection portion by a rounded area or fillet.

In this way, pressure losses during air flow in the recessed area are limited.

The tubes can be connected to a tube connection portion arranged on a radially inner part of the housing.

The cooling device may have a cooling air supply line opening into the internal volume of the housing, partly radially outside the housing.

The supply line can lead into the housing in a radially oriented direction. The supply line may open in an axially central area of the housing.

The cooling device may comprise at least two first tubes and at least two second tubes, the first and second tubes extending circumferentially on either side of the housing, respectively, the housing defining at least one first recessed area located axially between two first tubes and at least one second recessed area located axially between the two second tubes.

The ratio between the circumferential dimension of the housing at each recessed area and the circumferential dimension of the housing at each tube connection area may be between 0.2 and 0.7.

The invention also relates to an assembly comprising an annular casing of a turbomachine, for example an annular turbine casing, characterised in that it comprises a cooling device of the aforementioned type, mounted on said casing and surrounding said casing.

The invention also relates to a turbomachine comprising at least an assembly of the aforementioned type.

The invention will be better understood and other details, characteristics and advantages of the invention will appear when reading the following description, which is given as a non-limiting example, with reference to the attached drawings.

DETAILED DESCRIPTION

Figure 1:
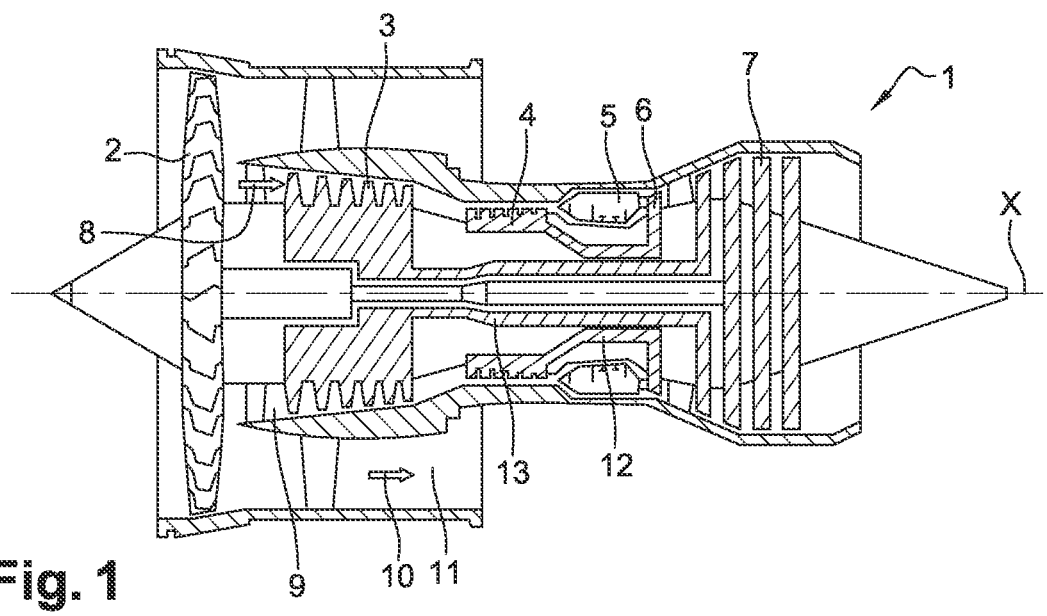
FIG. 1 is an axial cross-sectional view of a double-flow turbojet engine of the prior art.
Figure 2:
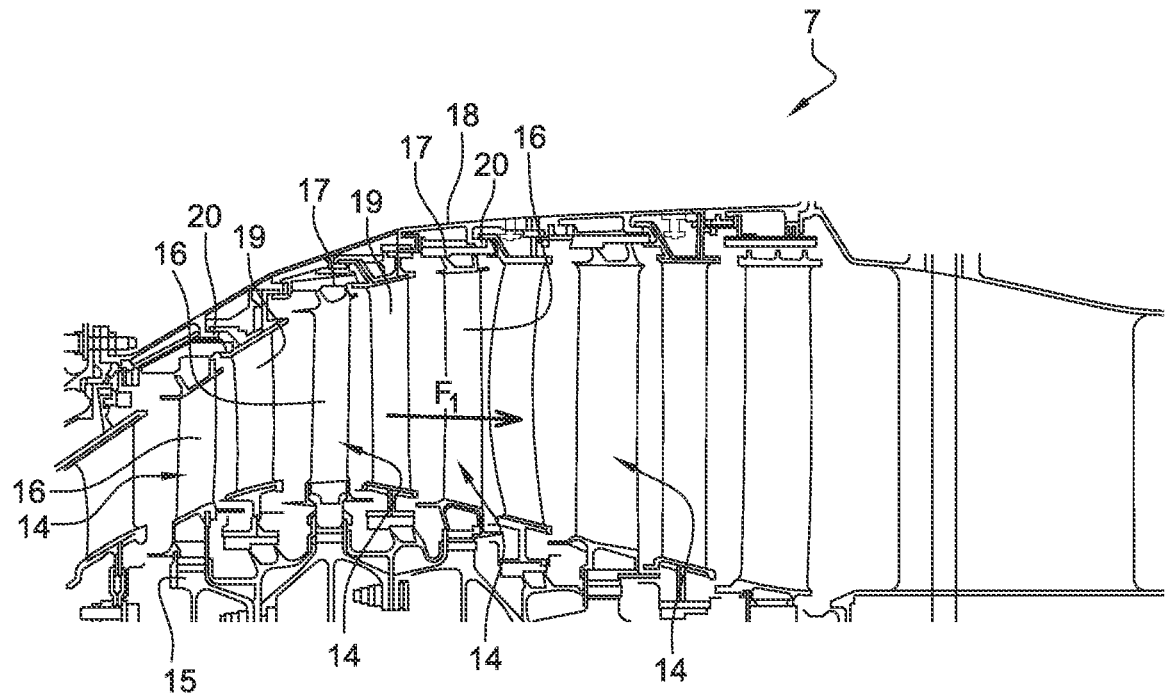
FIG. 2 is an axial cross-sectional view of a part of the turbojet engine of the prior art, illustrating in particular the low-pressure turbine.
Figure 3:
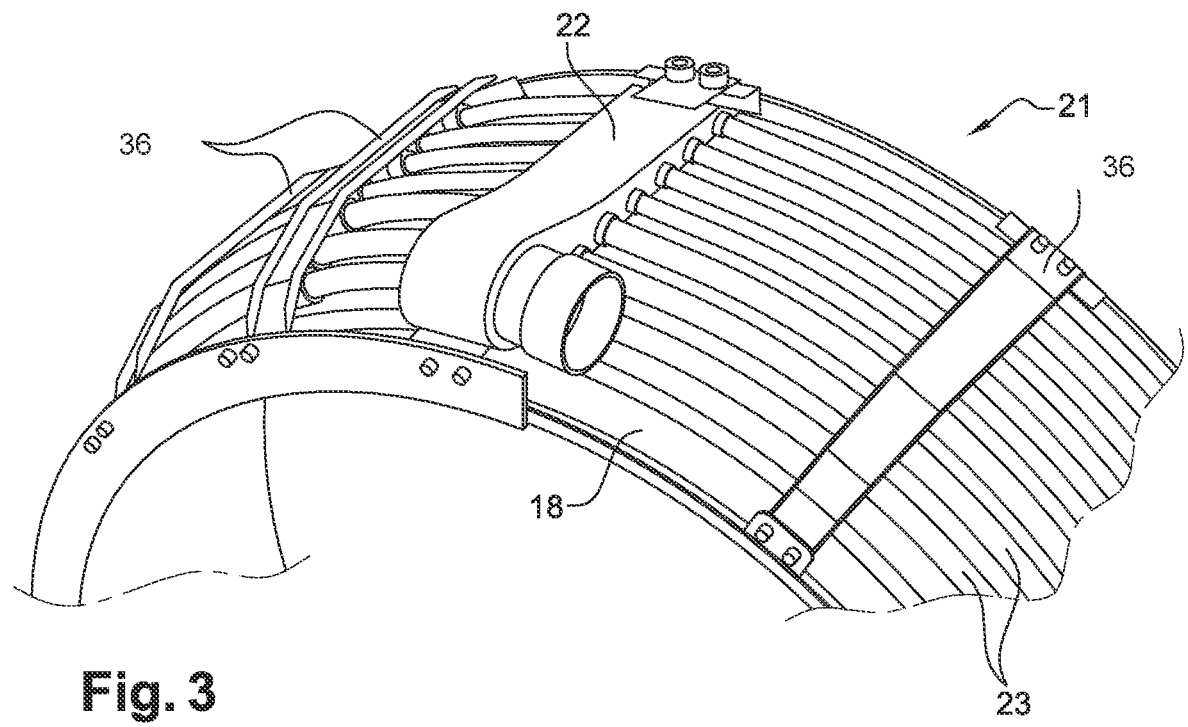
FIG. 3 is a perspective view of a cooling device of the prior art.
Figure 4:
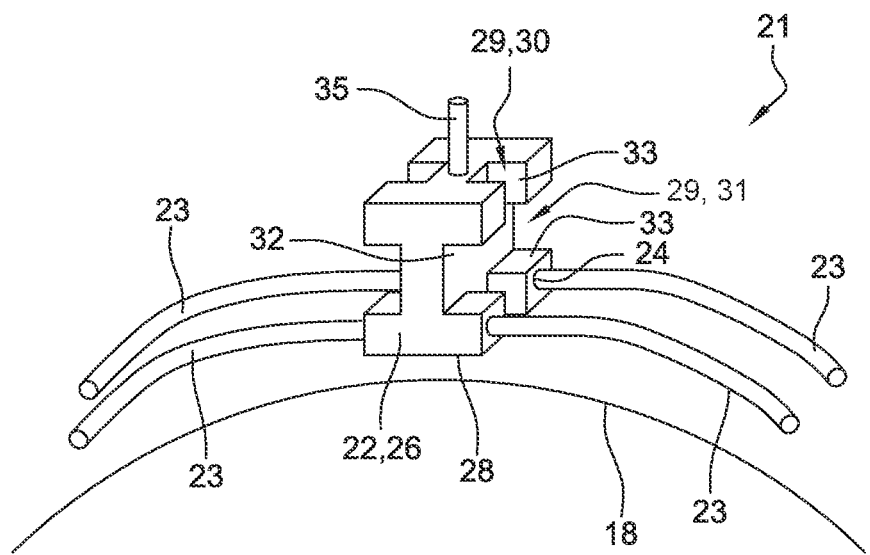
FIG. 4 is a perspective view of a part of a cooling device according to an embodiment of the invention.
Figure 5:
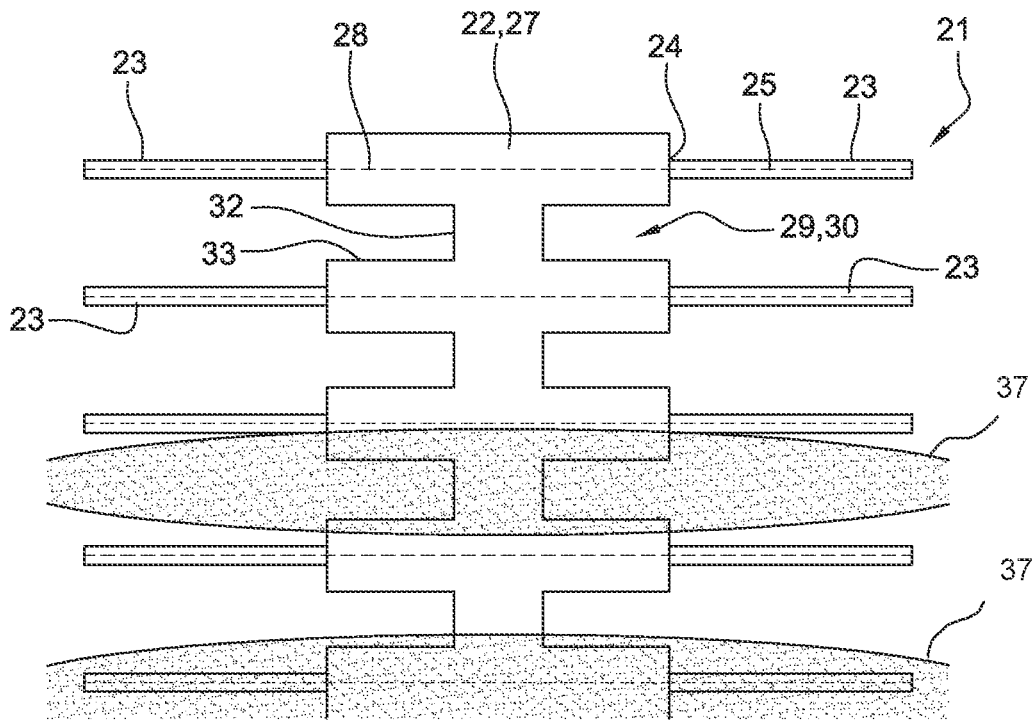
FIG. 5 is a schematic view of a portion of a cooling device according to the invention.

FIGS. 4 to 5 show a part of a cooling device 21 for a turbomachine 1 casing 18 according to an embodiment of the invention. In the description, the terms "axial", "radial" and "circumferential" are defined relative to the axis of the casing 18, which also corresponds to the axis X of the turbomachine 1.

Figure 6:
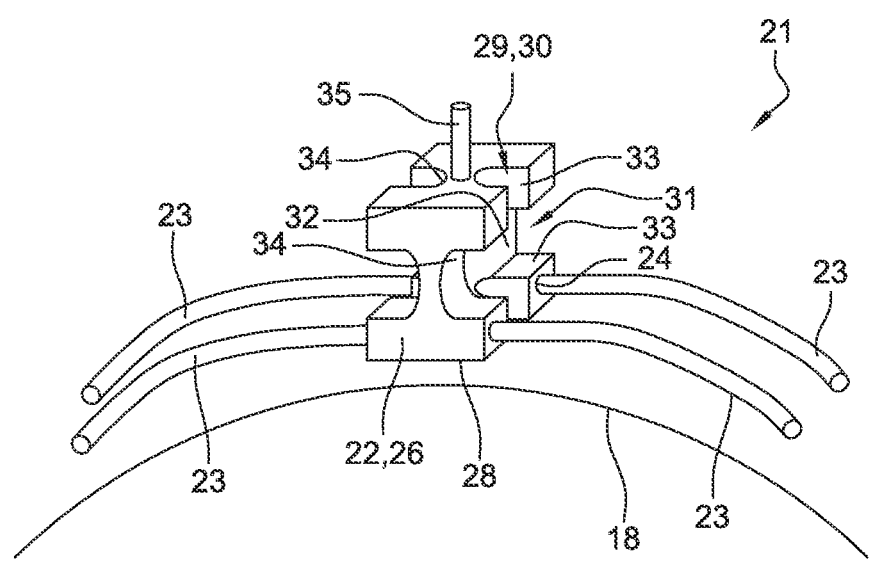
FIG. 6 is a view corresponding to FIG. 4, illustrating an alternative embodiment of the invention.

The device comprises a collector housing 22 extending along the axis of the casing 18, hollow and delimiting an internal volume. Although the same reference numeral for collector housing 22 is used in both prior art FIG. 3 and FIGS. 4-6, the collector housing 22 described in connection with FIGS. 4-6 includes different structures and features from that of the prior art, as detailed herein.

Cooling tubes 23 extending circumferentially on both sides of collector housing 22 are connected to the internal volume of collector housing 22.

For example, each tube 23 has a first circumferential end 24 opening into collector housing 22 and a second closed circumferential end, as is known per se. Each tube 23 has a circular cross-section, with air ejection openings 25 formed in the radially inner part of each tube 23, the ejection openings 25 opening out opposite the casing 18. Each tube 23 extends circumferentially around casing 18, over an angular range that can vary depending on the application. For example, each tube 23 extends circumferentially about 90 or 180 degrees.

The tubes 23 are connected to the radially inner part 26 of the collector housing 22.

Air ejection openings 28 are also formed in the radially inner part of the collector housing 22, in particular on the radially inner surface 27 facing the housing, said openings 28 opening towards the casing 18.

The holes 28 in the collector housing 22 and the holes 25 in the tubes 23 are evenly distributed around the circumference and are located here in the same radial plane. The pitch between openings 25, 28 can be fixed or variable, depending on the application. For example, openings 25, 28 have a circular cross section.

Collector housing 22 has air passages formed by an air passage or recessed area 29. Each air passage or recessed area 29 has one or more portions, including a straight portion, or groove 30 extending radially from the radially inner end to the radially outer end of the collector housing 22. Each recessed area 29 further comprises a rectilinear portion, or groove 31 formed by an axially extending groove opening at its ends.

For each pair of adjacent tubes 23 located on the same circumferential side of the collector housing 22, the corresponding radial groove 30 is located axially between the radial planes in which said adjacent tubes 23 extend.

Each groove 30, 31 is delimited by a bottom surface 32 and two lateral surfaces 33. In the embodiment illustrated in FIGS. 4 and 5, the lateral surfaces 33 are flat and perpendicular to the bottom surface 32. In another embodiment illustrated in FIG. 6, the lateral surfaces 33 and the bottom surface 32 may have connecting fillet areas or rounded areas 34.

The ratio between the circumferential dimension of the collector housing 22 at each recessed area 29 and the circumferential dimension of the collector housing 22 at each tube 23 connection area at the radially inner end of collector housing 22 may be between 0.2 and 0.7.

In addition, the cooling device 21 has a cooling air supply line 35 which opens into the inner volume of the collector housing 22, partly radially outside the collector housing 22 and in an axially central area of the collector housing 22.

The supply line 35 leads into the collector housing 22 in a radially oriented direction.

During operation, cooling air is supplied to the collector housing 22 via supply line 35. This cooling air is then evenly distributed between the various cooling tubes 23. Part of the air in collector housing 22 is ejected towards casing 18 through openings 28 of collector housing 22. Part of the air in tubes 23 is ejected towards casing 18 through openings 25 of collector housing 22. This cooling air, represented in FIG. 5 by the shaded ovals 37, impacts the casing 18, lowering its temperature. The air used to cool the casing 18 is discharged not only into the axially delimited spaces between the tubes 23, but also through the recessed areas 29. In particular, part of the cooling air heated on contact with casing 18 is discharged radially outwards through the radial grooves 30 and/or through the axial grooves 31.

This improves the cooling of casing 18, avoiding stagnation of hot air underneath collector housing 22, i.e. radially between collector housing 22 and casing 18.

The invention claimed is:

1. A cooling device for an annular casing of a turbomachine, comprising:
    a collector housing extending along an axis (X) of the annular casing and having a radially inner end and radially outer end, the collector housing comprising ejection openings in a radially inner part of the collector housing facing the annular casing; and
    at least two cooling tubes extending circumferentially and connected to an internal volume of the collector housing at the radially inner end, the at least two cooling tubes comprising ejection openings in a radially inner part of the at least two cooling tubes facing the annular casing;
        the collector housing further comprising an air passage formed by a radial groove extending radially from the radially inner end of the collector housing to the radially outer end of the collector housing; and
        the collector housing further comprising an axial groove extending from a first axial end to a second axial end of the collector housing.

2. The cooling device according to claim 1, characterised in that one or both of the axial groove and the radial groove are connected to the radially inner end of the collector housing by a rounded area or a connecting fillet.

3. The cooling device according to claim 2, characterised in that the cooling device comprises a cooling air supply duct opening into the internal volume of the collector housing, wherein the cooling air supply duct is partly radially external to the collector housing.

4. The cooling device according to claim 2, characterised in that the at least two cooling tubes further comprise at least two first tubes and at least two second tubes, the at least two first tubes and the at least two second tubes extending circumferentially on either side of the collector housing, respectively, the collector housing defining at least one first radial groove located axially between the at least two first tubes and at least one second radial groove located axially between the at least two second tubes.

5. The cooling device according to claim 1, characterised in that the cooling device comprises a cooling air supply duct opening into the internal volume of the collector housing, wherein the cooling air supply duct is partly radially external to the collector housing.

6. The cooling device according to claim 1, characterised in that the at least two cooling tubes further comprise at least two first tubes and at least two second tubes, the at least two first tubes and the at least two second tubes extending circumferentially on either side of the collector housing, respectively, the collector housing defining at least one first radial groove located axially between the at least two first tubes and at least one second radial groove located axially between the at least two second tubes.

7. The cooling device according to claim 6, characterised in that the ratio between a circumferential dimension of the collector housing at each recessed area and a circumferential dimension of the collector housing at each radially inner end is between 0.2 and 0.7.

8. The cooling device according to claim 1, characterised in that the ratio between a circumferential dimension of the collector housing at each recessed area and a circumferential dimension of the collector housing at each radially inner end is between 0.2 and 0.7.

9. A turbomachine assembly comprising the annular casing of the turbomachine and the cooling device according to claim 1, the cooling device mounted on said annular casing and surrounding said annular casing.

10. A turbomachine comprising at least one turbomachine assembly according to claim 9.

* * * * *